United States Patent [19]

Oishi

[11] Patent Number: 4,796,135
[45] Date of Patent: Jan. 3, 1989

[54] TWO LAYERED TAPE PAD FOR A MAGNETIC TAPE CASSETTE

[75] Inventor: Kengo Oishi, Kanagawa, Japan

[73] Assignee: Fuji Photo Film Co., Ltd., Kanagawa Japan

[21] Appl. No.: 39,418

[22] Filed: Apr. 17, 1987

[30] Foreign Application Priority Data

Apr. 17, 1986 [JP] Japan .................... 61-88767

[51] Int. Cl.⁴ .............................. G11B 15/60
[52] U.S. Cl. .................... 360/130.33; 360/130.32; 360/132
[58] Field of Search ............ 360/130.3–130.33, 360/132, 128; 242/197–200

[56] References Cited

U.S. PATENT DOCUMENTS

| | | | |
|---|---|---|---|
| 3,682,486 | 8/1972 | Zwetzig et al. | 360/130.33 |
| 4,417,704 | 11/1983 | Oishi et al. | 242/199 |
| 4,669,020 | 5/1987 | Shepherd et al. | 360/130.33 |

FOREIGN PATENT DOCUMENTS

| | | | |
|---|---|---|---|
| 0155815 | 12/1979 | Japan | 360/130.31 |
| 0191460 | 9/1985 | Japan | 360/128 |
| 0253077 | 12/1985 | Japan . | |
| 2018492 | 10/1979 | United Kingdom | 360/130.33 |

Primary Examiner—Stuart N. Hecker
Assistant Examiner—David J. Severin
Attorney, Agent, or Firm—Sughrue, Mion, Zinn, Macpeak & Seas

[57] ABSTRACT

In a magnetic recording tape cassette, a tape pad to be urged in contact with a magnetic head of a tape-recorder with the intervention of a magnetic tape is secured to a resilient metal strip. The tape pad is composed of at least one layer of a porous synthetic resin material. The tape contacting surface of the pad is impregnated with a lubricant and/or an anti-static agent. Preferably, the pad is impregnated on the back surface thereof with an adhesive to ensure firm adhesion to the resilient metal strip.

2 Claims, 1 Drawing Sheet

TWO LAYERED TAPE PAD FOR A MAGNETIC TAPE CASSETTE

BACKGROUND OF THE INVENTION

1. Field of the Invention

This invention relates to a tape pad for backing a magnetic tape in magnetic recording tape cassette against a magnetic head of a recording/reproducing apparatus.

2. Description of the Prior Art

A magnetic tape for recording and reproducing information by use of a tape-recorder is wound up on a pair of hubs in a magnetic tape cassette and is urged to be put into contact with a magnetic head of the tape-recorder through an opening provided on one side of the cassette. The tape cassette is provided with a tape pad for backing the magnetic tape against the magnetic head. The tape pad is supported on a resilient strip-like member made of metal and is formed of felt material having raised hair of rabbits or sheep.

Since the felt material is made of natural fibers, the density thereof is uneven causing unstable contact of the magnetic tape with the magnetic head and the friction coefficient thereof with the tape is hard to be set at a desired value, and further the fibers of the felt material are liable to fall off causing drop outs of the recorded or reproduced information.

In order to solve this problem, it has been suggested to make the pad of synthetic resin. However, if the synthetic resin is used for the pad, an inorganic filler must be mixed therein to enhance the abrasion resistance and reduce the friction coefficient, which is undesirable because it will scratch the surface of the magnetic tape and need a special adhesive to fix the pad to the resilient member.

SUMMARY OF THE INVENTION

In view of the above situation, it is the primary object of the present invention to provide a tape pad for a magnetic tape cassette which has high abrasion resistance and a small friction coefficient and further can be easily and firmly secured to the resilient strip-like member.

The tape pad according to the present invention is constituted of at least one layer, wherein at least the surface layer which is to make contact with the magnetic tape is made of a porous synthetic resin material.

According to the present invention as described above, the porous synthetic resin material can be impregnated with a lubricant or anti-static agent, whereby the tape contacting surface thereof can be made to have high abrasion resistance and a small friction coefficient. Further, since the pad can be impregnated also with an adhesive, it is easily and firmly secured to the resilient member.

DESCRIPTION OF THE PREFERRED EMBODIMENT

Now the present invention will be described in detail with reference to the accompanying drawings.

Figure 1:
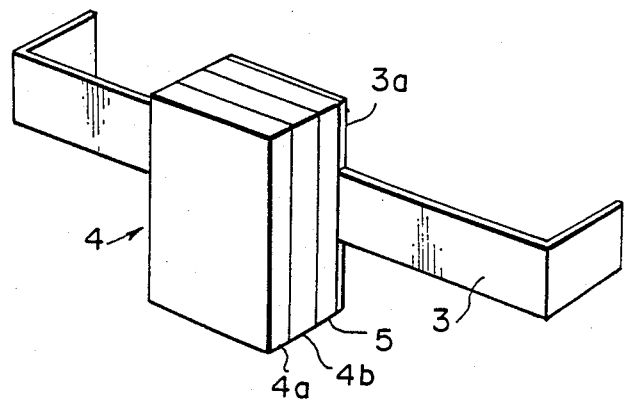
FIG. 1 is a perspective view of the tape pad in accordance with an embodiment of the present invention.
Figure 2:
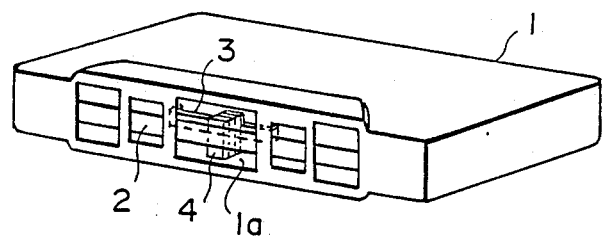
FIG. 2 is a perspective view of a magnetic tape cassette provided with the tape pad in accordance with the present invention.

An embodiment of the present invention is shown in FIGS. 1 and 2. In FIG. 2, a magnetic tape 2 wound up on a pair of hubs (not shown) is retained in a magnetic tape cassette casing 1 and is exposed through an opening 1a formed on one side face of the cassette casing 1 so as to be put into contact with a magnetic head provided in a tape-recorder not shown. In the magnetic tape cassette casing 1 is provided a resilient member 3 in the form of a strip made of phosphor bronze or the like supported at both ends in the casing 1. At about the center of the resilient member 3 is secured a pad 4 on the outer side so that it will resiliently put the magnetic tape 2 into contact with a magnetic head inserted into the opening 1a.

The pad 4 has two layers 4a and 4b as shown in FIG. 1 which are both made of porous polyethylene containing carbon. The surface layer 4a of the pad 4 to be put into contact with the magnetic tape 2 is impregnated with a lubricant such as silicone oil and an anti-static agent such as surfactant. The resilient member 3 is provided with support portion 3a of the same shape as that of the pad 4 at the center thereof and an adhesive layer 5 is disposed on the support portion 3a. The second layer 4b of the pad 4 is adhered to the support portion 3a of the resilient member 3 by means of said adhesive layer 5 which is for example of acrylic adhesive.

In operation of the above-described embodiment of the present invention, the frictional resistance of the tape pad 4 at the time of feeding the magnetic tape 2 is reduced and accordingly there is an anti-static effect since the first or surface layer 4a of the pad 4 contacting the tape 2 is impregnated with a lubricant and an anti-static agent. Further, since the pad 4 is made of polyethylene, the abrasion resistance is enhanced and it is possible oo provide a constant pressure of contact of the tape 2 on the magnetic head. Furthermore, since no natural hair is used, there is no fear of drop outs caused by falling off of the hair.

The pad 4 can be firmly secured to the resilient member 3 by use of an adhesive which has a high bonding force with respect to the resilient member 3 which is made of metal, since the adhesive is impregnated in the porous portion of the second layer 4b of the pad 4. In addition, since the pad 4 does not contain a filler as the conventional plastic pad, there is no fear of scratching the surface of the magnetic tape 2.

In the above-described embodiment of the present invention, the pad 4 is composed of two layers 4a and 4b wherein one layer 4a is impregnated with a lubricant and an anti-static agent and the other layer 4b is impregnated with an adhesive. However, it should be noted that the number of the layers is not limited to two but may be only one in which one side surface thereof on the tape side is impregnated with a lubricant and an anti-static agent and the other side surface thereof on the resilient member side is impregnated with an adhesive. Further, the material constituting the porous synthetic resin to form the pad 4 is not limited to polyethylene but may be "Teflon" (PTFE: polytetrafluoroethylene).

Further, it will be noted that the shape of the pad 4 is not limited to the one as shown in the drawings. It will also be noted that the pad may be constituted of more than two layers.

I claim:

1. A tape pad for a magnetic recording tape cassette secured to a resilient strip-like member supported in a cassette casing to be urged on a magnetic head of a tape-recorder with the intervention of a magnetic tape therebetween, said pad comprising two layers including a surface layer which is to be put into contact with said magnetic tape and which is made of a porous synthetic resin material impregnated with at least one of a lubricant and an anti-static agent and, another layer which is to be adhered to said resilient strip-like member and which is impregnated with an adhesive.

2. A tape pad for a magnetic recording tape cassette as defined in claim 1 wherein said synthetic resin material is polyethylene.

* * * * *